United States Patent

Morioka et al.

[11] Patent Number: 5,322,006
[45] Date of Patent: Jun. 21, 1994

[54] CONTINUOUS FRYING APPARATUS

[75] Inventors: Saburo Morioka, Sakurai; Toshihiko Narukami, Ikoma; Tamio Nagai, Yamato-Takada; Naoaki Inoue, Nara, all of Japan

[73] Assignee: House Food Industrial Co., Ltd., Osaka, Japan

[21] Appl. No.: 40,282

[22] Filed: Mar. 30, 1993

[30] Foreign Application Priority Data

Mar. 31, 1992 [JP] Japan .................. 4-108693
Mar. 31, 1992 [JP] Japan .................. 4-108694

[51] Int. Cl.⁵ ............................................. A47J 37/12
[52] U.S. Cl. ........................................ 99/405; 99/404; 99/407
[58] Field of Search ............... 99/330, 360, 386, 403, 99/404–406, 407, 420, 443 C, 477; 426/523, 520, 509, 417

[56] References Cited

U.S. PATENT DOCUMENTS

| | | | |
|---|---|---|---|
| 2,088,946 | 8/1937 | Carpenter | 99/405 |
| 2,249,792 | 7/1941 | Skinner | 99/404 |
| 2,463,112 | 3/1949 | Kipnis | 99/404 |
| 2,853,937 | 9/1958 | Peck | 99/404 |
| 3,585,923 | 6/1971 | Waller | 99/356 |
| 3,641,923 | 2/1972 | Wilkinson | 99/444 |
| 3,761,290 | 9/1973 | Brunner | 99/330 |
| 3,793,937 | 2/1974 | Lipoma | 99/355 |
| 4,228,730 | 10/1980 | Schindler et al. | 99/407 |
| 4,694,742 | 9/1987 | Dover | 99/443 C |
| 4,706,557 | 11/1987 | Feng et al. | 99/355 |

FOREIGN PATENT DOCUMENTS 3-34927 5/1924 Japan .

Primary Examiner—Timothy F. Simone
Attorney, Agent, or Firm—Mason, Fenwick & Lawrence

[57] ABSTRACT

A continuous frying apparatus comprising a primary frying vessel for transferring foodstuff with the stream of oil; a secondary frying vessel for holding and frying the foodstuff below the oil surface with the use of a conveyor including rollers, a running member moving around the rollers and interlocked therewith, and projections arranged on the outer surface of the running member; and a joining section for connecting the primary frying vessel and the secondary frying vessel. According to the present invention, one of the rollers which is arranged nearest the starting side of the secondary frying vessel is positioned so that the intersection with the oil surface of a circular arc defined by the ends of the projections moving around that roller is positioned closer to the ending side of the secondary frying vessel than intersection of the oil stream flowing downward and out of the primary frying vessel meeting with the oil level in the secondary frying vessel.

2 Claims, 4 Drawing Sheets

CONTINUOUS FRYING APPARATUS

BACKGROUND OF THE INVENTION

Field of the Invention

The present invention relates to a continuous frying apparatus suitable for frying various kinds of foodstuff, and more particularly to a continuous frying apparatus which can uniformly fry the foodstuff without causing deformation, breakage and/or irregularity thereof.

Description of the Related Art

There is known a continuous frying apparatus of the prior art comprising a primary frying vessel for transferring foodstuff with a stream of oil, a secondary frying vessel for holding and frying the foodstuff beneath the surface of oil with the use of a conveyor, and a joining section for connecting the primary frying vessel and the secondary frying vessel, for example as, disclosed in Japanese Patent Publication No. 34927/1991. In such an apparatus, the foodstuff is fried until it possesses a hardness where exterenl forces acting on the foodstuff during the initial frying process in the primary vessel cause no deformation to the foodstuff. The hardened foodstuff is then received by projections of the conveyor at the joining section and transferred to the secondary vessel in order to undergo the second frying process. In the secondary frying vessel, the foodstuff is puffed and dried without special attention to the preventing of deformation of the foodstuff.

In the frying apparatus of the prior art, the foodstuff fried in the primary frying vessel flow down together with the oil along the joining section between the two frying vessels at a relatively high speed. At this high speed the foodstuff may strike against the projections of the conveyor for receiving them in the joining section. Accordingly, the foodstuff is often deformed or broken although it is hardened in the primary frying vessel to a degree at which they should not be succeptable to deformation.

In addition, since the oil flowing down along the joining section strikes against the projections and flows toward the base of the projections along them, turbulence in a region where the oil flows into the secondary frying vessel. This interferes with the smooth trasfer of the foodstuff into the secondary frying vessel and thereby causes the irregularity of the fried products.

Further, the foodstuff is often sandwiched or clogged between the ends of the projections and the side walls of the frying vessel and therefore is liable to be deformed or broken when being discharged from the frying vessel. In addition, since the fried material is raked up by a sliding motion along the side walls of the frying vessel, it is liable to be deformed or broken.

SUMMARY OF THE INVENTION

The inventors of the present invention, have diligently examined the problems of the prior art mentioned above. They discovered it is possible to have final products each of which is not deformed and is uniformly and highly puffed by arranging the meeting point of the ends of the projections meeting with the oil level to a specified position to facilitate the smooth transfer of the foodstuff into the second frying vessel and thereby preventing ones over deformation or breakage from occuring at the joining section.

According to the present invention there is provided a continuous frying apparatus comprising a primary frying vessel for transferring foodstuff together with the stream of oil; a secondary frying vessel for holding and frying the foodstuff beneath the surface of the oil with the use of a conveyor including rollers, a running member moving around the rollers and being interlocked therewith, and projections arranged on the outer surface of the running member; and a joining section for connecting the primary frying vessel and the secondary frying section. The roller arranged nearest the starting side (inlet side) of the secondary frying vessel is positioned so that the intersection of the oil level with a circular arc defined by the ends of the projections moving around the roller is positioned closer to the edge of the secondary frying vessel than the intersection of the oil stream flowing downwardly and out of the primary frying vessel with the oil level in the secondary frying vessel.

Further, in the continuous frying apparatus of the prior art, the foodstuff is often sandwiched or clogged between the tip ends of the projections and the side walls of the frying vessel and therefore is liable to be deformed or broken when being discharged from the frying vessel. In addition, since the foodstuff is raked up by a sliding motion along the side walls of the frying vessel, it is liable to be deformed or broken.

We have found that it is possible to have final products each being uniformly fried and not deformed by positioning the running member extending from the roller arranged at the edge of the frying vessel and inclined upward along with providing a conveyor as a discharging means for discharging the fried materials from the frying vessel where the discharging conveyor is situated at a specified position and a specified angle.

According to the present invention there is also provided a continuous frying apparatus for carrying out the frying process with the use of a conveyor including rollers, a running member moving around the rollers and driven thereby, and projections arranged on the outer surface of the running member. The roller at the edge of the frying vessel is positioned so that an angle "b" defined by the running member and by the oil level is between 3° and 20°, and in that a discharging conveyor for discharging the foodstuff "A" from the frying vessel satisfies following conditions;

i) it is positioned with the bottom end of the discharging conveyor in the oil and the top end in the area above the secondary frying vessel;
 ii) an angle "a" defined by the upper surface of the discharging conveyor and the oil level should be between 3° and 7°, and
 iii) a distance "Y" between the intersection of the upper surface of the discharging conveyor with the oil level and a contact point of the oil level with the ends of the projections at the edge of the frying vessel satisfies the following expression:

$$Y \geq X/\sin \text{"b"}$$

wherein "X" = the number of pieces of the foodstuff "A" contained in a partition formed by a pair of adjacent projections and side walls of the frying vessel × (the speed of the running member/the speed of the discharging conveyor) × the thickness of one piece of foodstuff "A".

BRIEF DESCRIPTION OF THE DRAWINGS

Preferred embodiments of the present invention hereinafter will be described with reference to the accompanying drawings, in which.

DESCRIPTION OF THE PREFERRED EMBODIMENTS

First Embodiment

Figure 1:
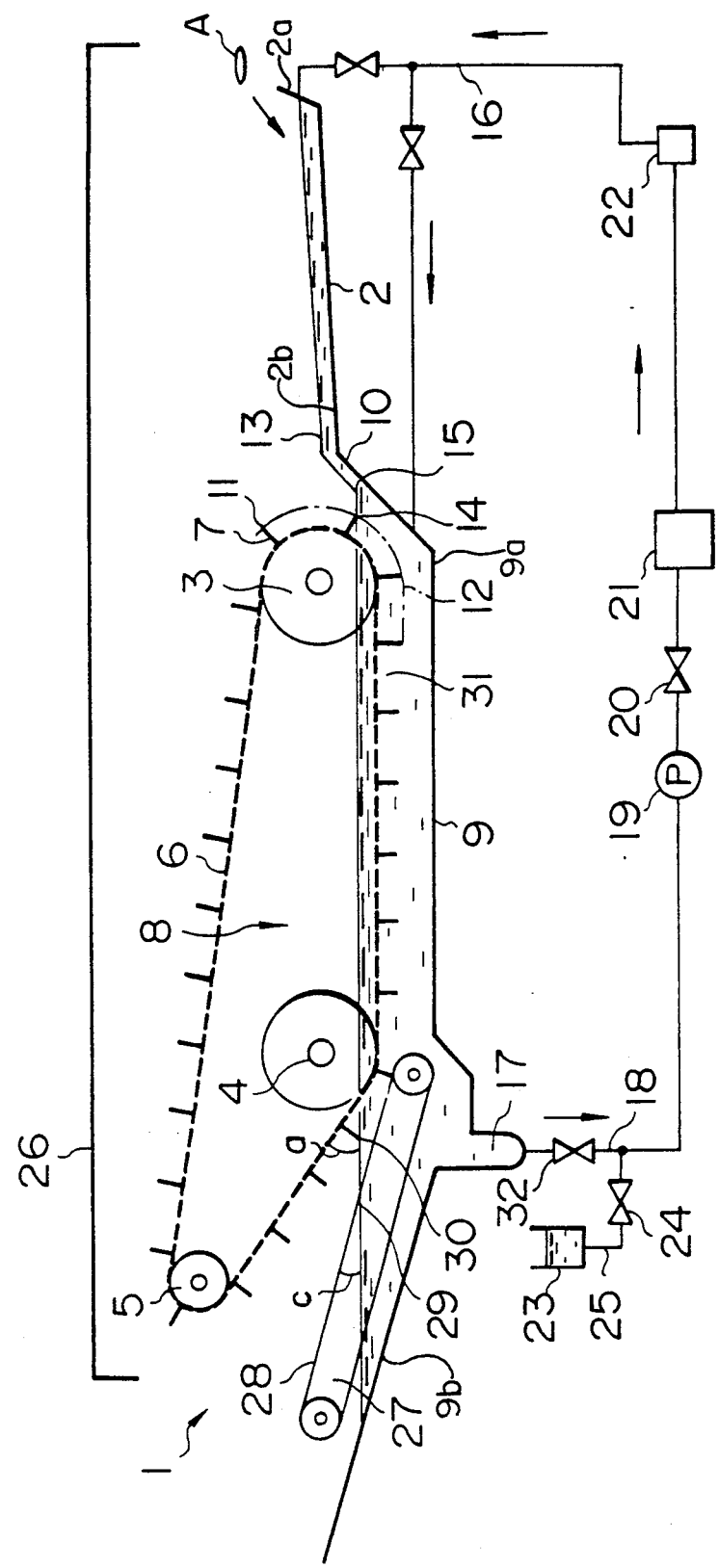
FIG. 1 is a schematic view of a continuous frying apparatus of a first embodiment of the present invention.
Figure 2:
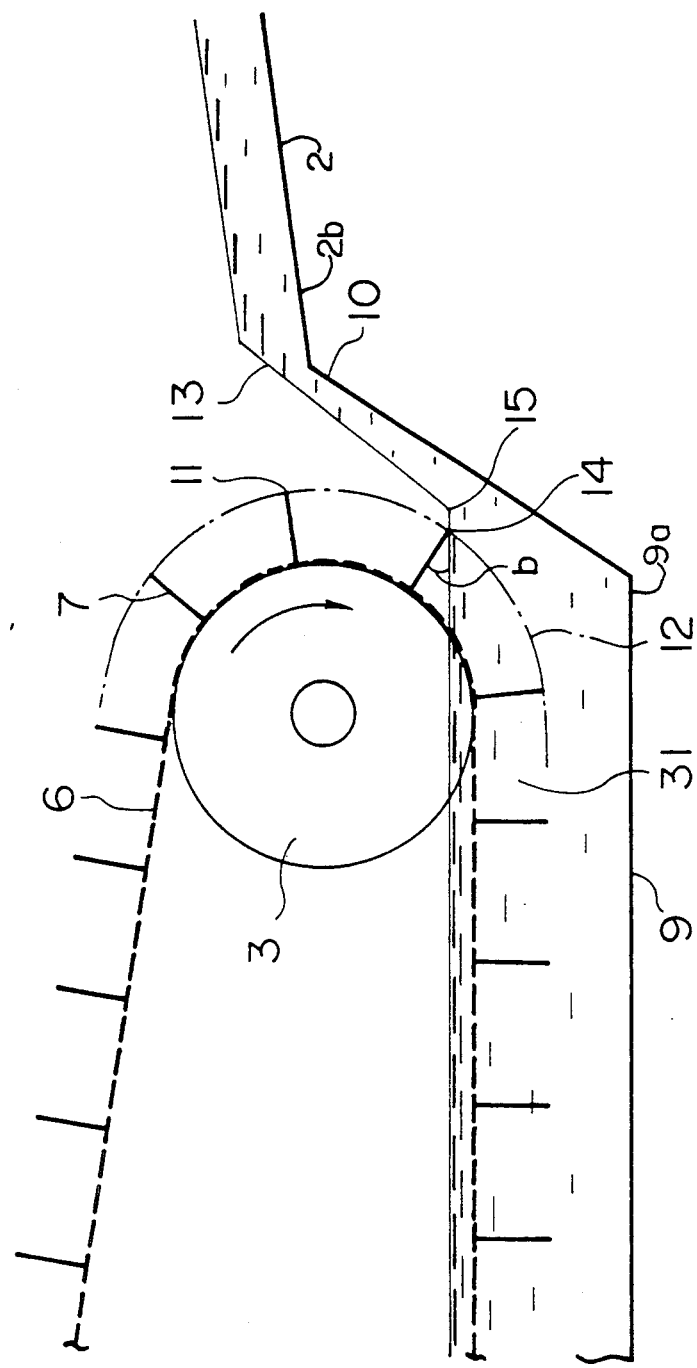
FIG. 2 is an enlarged schematic view showing a region of a joining section of the frying apparatus of FIG. 1.

A continuous frying apparatus 1 of the first embodiment of the present invention, as shown in FIGS. 1 and 2, has a primary frying vessel 2 having a relatively shallow bottom and a secondary frying vessel 9 having a relatively deep bottom. These frying vessels 2 and 9 are connected via a joining section 10 so that foodstuff "A" can flow smoothly by the stream of oil from the primary frying vessel 2 to the secondary frying vessel 9.

An oil supplying pipe 16 is connected to the starting side of the primary frying vessel 2 through an opening formed in the wall of the vessel 2 so that the oil flows as a laminal flow in parallel with the bottom of the vessel 2. In this case it is preferable to arrange the openings so that the oil flows over the whole width of the wall of the primary frying vessel 2 in order to prevent the generation of turbulence of oil flowed into the vessel 2 and to obtain a desired laminal flow.

The inclination and the length of the primary frying vessel 2 can be properly determined in consideration of the type, amount and kinds of ingredients in the foodstuff as well as the flow rate of the oil. For example, if controlling the moisture of about 35% to 45% contained in the foodstuff prior to undergoing the frying process to about 5% to 15% after the primary frying process in order to prevent the foodstuff from sticking together, it is preferable to set the process conditions as follows; oil temperature: 150° C. to 200° C.; flow rate of oil: 10 m/min to 40 m/min; residence time: 10 sec to 25 sec; inclination of the primary frying vessel: 0.2° to 0.3°; and length of the primary frying vessel: 5 m to 7 m.

A conveyor 8 is arranged in the secondary frying vessel 9 so that it extends from the starting side (inlet side) 9a to the ending side (outlet side) 9b thereof to guide the foodstuff "A" while it is immersed in the oil. The conveyor 8 includes rollers 3, 4 and 5 the speed of rotation of which can be controlled, for example, by an infinite variable-speed motor, a running member 6 moving around the rollers 3, 4 and 5 and being interlocked therewith, and projections 7 arranged on the outer surface of the running member 6.

Each of rollers 3, 4 and 5 is mounted so that their respective positions can be changed vertically and horizontally in order to control the position of the projections 7.

It is preferable that the roller 5 is so positioned that the running member 6 between the rollers 4 and 5 inclines upwardly and rearwardly and forms an inclined angle "a" of 3° to 20° relative to the oil level.

The running member 6 can be made of a heat resistant plastic sheet such as Teflon or polyethylene with perforations of any suitable configuration through which the foodstuffs cannot pass or can be made of a net or a sheet of steel or stainless steel. The lower running part of the running member 6 is positioned below the oil level so as to effectively prevent the foodstuff in the secondary frying vessel 9 from floating or surfacing to the surface of the oil.

Each of the projections 7 project from the outer surface of the running member 6 at a suitable angle relative thereto. It is preferable to set an angle "b" formed between one projection 7 around the roller 3 and the oil level to 30° to 50° so as to facilitate the subversion of the foodstuff "A" below the surface of the oil level without causing any damage to it.

The foodstuff "A" flows out from the primary frying vessel 2 and is contained in partitions 31 defined by adjacent projections 7 and side walls of the secondary frying vessel 9 and conveyed through the oil along with the motion of the running member 6.

The characteristic feature of the present invention resides in specifying the position of the ends of the projection 7, i.e. the position of the roller 3 arranged at the starting side of the secondary frying vessel 9.

That is, the roller 3 situated nearest the starting side of the secondary frying vessel 9 is positioned so that the intersection 14 of a circular arc 12 defined by the ends 11 of the projections 7 moving around the roller 3 with the oil level 13 is positioned closer to the edge of the secondary frying vessel 9 than the intersection 15 of the oil stream flowing downward and out of the primary frying vessel 2 with the oil level in the secondary frying vessel 9.

It is a matter of course that the positioning of the roller 3 is influenced by the length of the projection 7. The shorter the projections 7 are, the closer the position of the roller 3 is set to the edge side of the secondary frying vessel 9; on the other hand, the shorter the projections 7 are, the closer the roller 3 is set to the starting side of the secondary frying vessel. The length of the projection 7 is determined based on the type or the configuration, etc. of the foodstuff "A". For example, if the foodstuff "A" is thin and flat in shape such as a potato chip, the length of the projections 7 is set at 30 mm to 70 mm. This is slightly longer than a length corresponding to a thickness of a stack of 4 to 5 puffed potato chips, which enables the foodstuff "A" to be stably conveyed by the projections 7 and to be uniformly fried. The clearance between the ends 11 of the projections 7 and the bottom wall of the secondary frying vessel 9 is set so that no foodstuff is deformed or broken due to clogging in the clearance. For example, if the foodstuff "A" is potato chips, then the clearance is so set between 10 mm to 50 mm which corresponds to a thickness of a stack of at least 2 to 3 chips.

The projections 7 may be fabricated using any suitable solid plate or perforated plate. The solid plates 7 are suitable for discharging the fried products from the oil onto a discharging conveyor 27. The perforated plates 7 such as meshed plates are suitable for effectively separating the foodstuff stuck to the projections 7 during its passage through the oil in the secondary frying vessel 9.

An oil pool 17 is formed with a meshed metal filter and situated at the ending side of the bottom of the secondary frying vessel 9 and a discharging pipe 18 is connected to the oil pool 17.

The joining section 10 is arranged so that it connects the primary frying vessel 2 and the secondary frying vessel 9 and is inclined so that the foodstuff "A" can smoothly flow out from the primary frying vessel 2 together with the oil into the secondary frying vessel 9. The inclined angle of the joining section 10 is preferably between 30° to 60°. That is, if the inclination is steeper than the range mentioned above, the flow rate of the oil becomes too fast causing turbulence in the secondary frying vessel 9 into which the oil flows. On the other hand, if the inclination of the joining section 10 is not as the range mentioned above, the flow rate is too slow and the foodstuff "A" would remain on the joining section 10.

The discharging pipe 18 connected to the oil pool 17 is connected to the oil supplying pipe 16 which is conected with the starting side of the primary and secondary frying vessels 2 and 9 forming an oil circulating path via an oil circulating pump 19, an oil flow rate control valve 20, an oil strainer 21 and a heat exchanger for heating oil 22.

It is possible to provide a heat exchanger for cooling oil (not shown) in another path in addition to the heat exchanger for heating oil 22 in order to prevent the degradation of oil.

A fresh oil tank 23 is connected to the oil circulating path via a fresh oil supply pipe 25 and a control valve 24 connected to the oil discharg pipe 18. The supply of fresh oil to the oil circulating path is controlled as necessary by the control valve 24.

A member denoted by a reference numeral 26 is a hood arranged above the primary and secondary frying vessels 2 and 9 respectively extending from the starting edge 2a of the primary frying vessel 2 to the ending edge 9b of the secondary frying vessel 9. The hood 26 prevents the dissipation of oil heat to the atmosphere and the oxidation of the oil.

Reference numeral 27 denotes a discharging conveyor which picks up the fried foodstuff from the secondary frying vessel 9 and discharging them while removing excess oil from the fried products.

The discharging conveyor 27 is arranged so that the lower end is immersed in the oil and the upper end is positioned in the area above the secondary frying vessel 2 and takes an attitude which either is parallel with the running member 6 between the rollers 4 and 5 or is divergent from the running member 6 toward the upper end of the discharging conveyor 27, more particularly at an angle "c" of 3° to 7° relative to the oil level. In addition, the discharging conveyor 27 is arranged so that the intersection 29 of the upper surface of the conveyor 27 with the oil level 13 is positioned away from the intersection 30 of the ends 11 of the projections 7 with the oil level 13 by a distance allowing the effective prevention of a prolonged floating of the foodstuff in the oil.

The conveyor belt of the discharging conveyor 27 may be made of any suitable heat resistant material such as iron or stainless steel. It is also possible to use an embossed material or a meshed material to prevent the fried products from being dropped back into the oil and to promote the removal of the excess oil from the fried products.

An example of a frying method using the apparatus of the present invention will be hereinafter described.

The foodstuff "A" is continuously supplied to the starting side 2a of the primary frying vessel 2 in accordance with any suitable feeding method. Oil of high temperature is continuously fed into the primary frying vessel 2 through the openings via the oil supplying pipe 16. Since the primary frying vessel 2 has a shallow bottom and is inclined downward toward the secondary frying vessel 9, the laminar flow from the starting side 2a to the ending side 2b of the primary frying vessel 2 is used thereby facilitating the transfer of the foodstuff "A" to the secondary frying vessel 9 without any external force and initially frying the foodstuff "A" during this period. The important process herein is to fry the foodstuff "A" in a substantially single layer by controlling both the supply of the foodstuff "A" (i.e. the number of pieces of foodstuff "A" supplied to the primary frying vessel 2) and the flow rate of oil in the primary frying vessel 2 (i.e. the amount of oil supplied to the primary frying vessel 2) in accordance with the frying time. Another important matter is to reduce the moisture contained in the foodstuff "A" after the primary frying process to approximately 7% in order to prevent the deformation or breakage of the foodstuff "A" during the secondary frying process in the vessel 9. It is also preferable to reduce the moisture contained in the foodstuff "A" after the primary frying process to approximately 15% in order to prevent the sticking of pieces of the foodstuff "A" with each other during the second frying process. The control of the amount of oil to the primary frying vessel 2 is carried out by controlling the valve 20.

After the completion of the primary frying process, the foodstuff "A" is hardened to a degree at which the pieces of the foodstuff "A" do not stick to each other and also are not easily deformed and the foodstuff "A" flows down toward the secondary frying vessel 9 via the joining section 10. Because the roller 3 is arranged at a position satisfying the above mentioned conditions, the foodstuff "A" is transferred smoothly by the oil along the joining section 10 into the oil in the secondary frying vessel 9 without striking against the projections 7 and is fried without floating on the oil surface. Accordingly the foodstuff "A" is not deformed or broken during the frying process.

The pieces of foodstuff "A" led to the starting side 9a of the secondary frying vessel 9 are successively contained into each partition 31 between consective projections 7 and fried beneath the surface of the oil during the passage thereof guided by the running member 6. During this time it is preferable to set the speed of the running member 6 to the same speed as that of the oil flowing into the secondary frying vessel 9 to effectively prevent the generation of the turbulence in the oil and damage to the foodstuff "A".

Since the fresh oil is forcibly supplied as needed at a low position of the starting side 9a of the secondary frying vessel 9, this stream of the fresh oil has a function of smoothly introducing the foodstuff "A" into the conveyor region under the oil surface and of sufficiently and uniformly puffing and evaporating water out of the foodstuff "A". The stream of the fresh oil also has a function of carrying away the debris of the fried material settled on the bottom of the secondary frying vessel 9 toward the oil pool 17. The fabrication of the projections 7 using a perforated plate is effective in the removal of debris which is stuck to the projections 7 during the passage in the oil in the secondary frying vessel 9.

It is necessary to adjust the position of the running member 6 of the conveyor 8 or to supply the oil so that the lower running member 6 is always immersed in the oil so that during the frying process the foodstuff always remains beneath the surface of the oil. The oil level 13 in the secondary frying vessel 9 can be also adjusted by appropriately controlling the oil level controlling valve 32 provided in the discharging pipe 18. The valve 32 is in a normally open condition.

The speed of the running member 6 is adjusted in accordance with the processing time and the processing amount in the secondary frying vessel 9. As mentioned above, since the foodstuff "A" in the second frying vessel 9 has been fried during the primary frying process, to an appropriate hardness, no deformation of the foodstuff occurs during the secondary frying process in the second frying vessel 9.

The foodstuf "A" is conveyed through the oil to the ending side 9b of the secondary frying vessel 9 while held beneath the surface of the oil. The foodstuff "A" floats in the oil 13 at the ending side 9b of the secondary frying vessel 9 and then is pushed by the projections 7 onto the discharging conveyor 27 and finally discharged out of the secondary frying vessel 9 after having any exess oil removed. The discharged foodstuff is then cooled by an appropriate method. The important features in this embodiment of the present invention are to provide a certain distance between the ends 11 of the projections 7 and the upper surface of the discharging conveyor 27 to prevent the foodstuff from being damaged and to incline the running member 6 between the rollers 4 and 5 upward and to arrange the discharging conveyor 27 substantially in parallel with the inclined running member 6 allowing the fried foodstuff to be smoothly transferred from the secondary frying vessel 9 onto the discharging conveyor 27.

According to the continuous frying apparatus of the first embobiment of the present invention it is possible to avoid the the foodstuff in the oil flow down the joining section from striking against the projections 7 of the conveyor 8 and thus to prevent the deformation and breakage of the foodstuff. In addition since the generation of turbulence and the delay of the foodstuff above the oil level at the starting region of the secondary frying vessel is effectively prevented, it is possible to obtain uniformly fried and highly puffed fried products having no deformation and breakage.

Since no foodstuff is caught between the projections and the bottom of the secondary frying vessel, it is possible to obtain the fried products with a good appearance without any damage. The supply of fresh oil from the low portion of the secondary frying vessel contributes to the sufficient and uniform puffing of the fry materials and to the removal of debris settled on the bottom of the secondary frying vessel by moving any debris into the oil pool. The use of the perforated plates as the projections of the conveyor enables any debris stuck to the projections to be easily removed therefrom.

Second Embodiment

Figure 3:
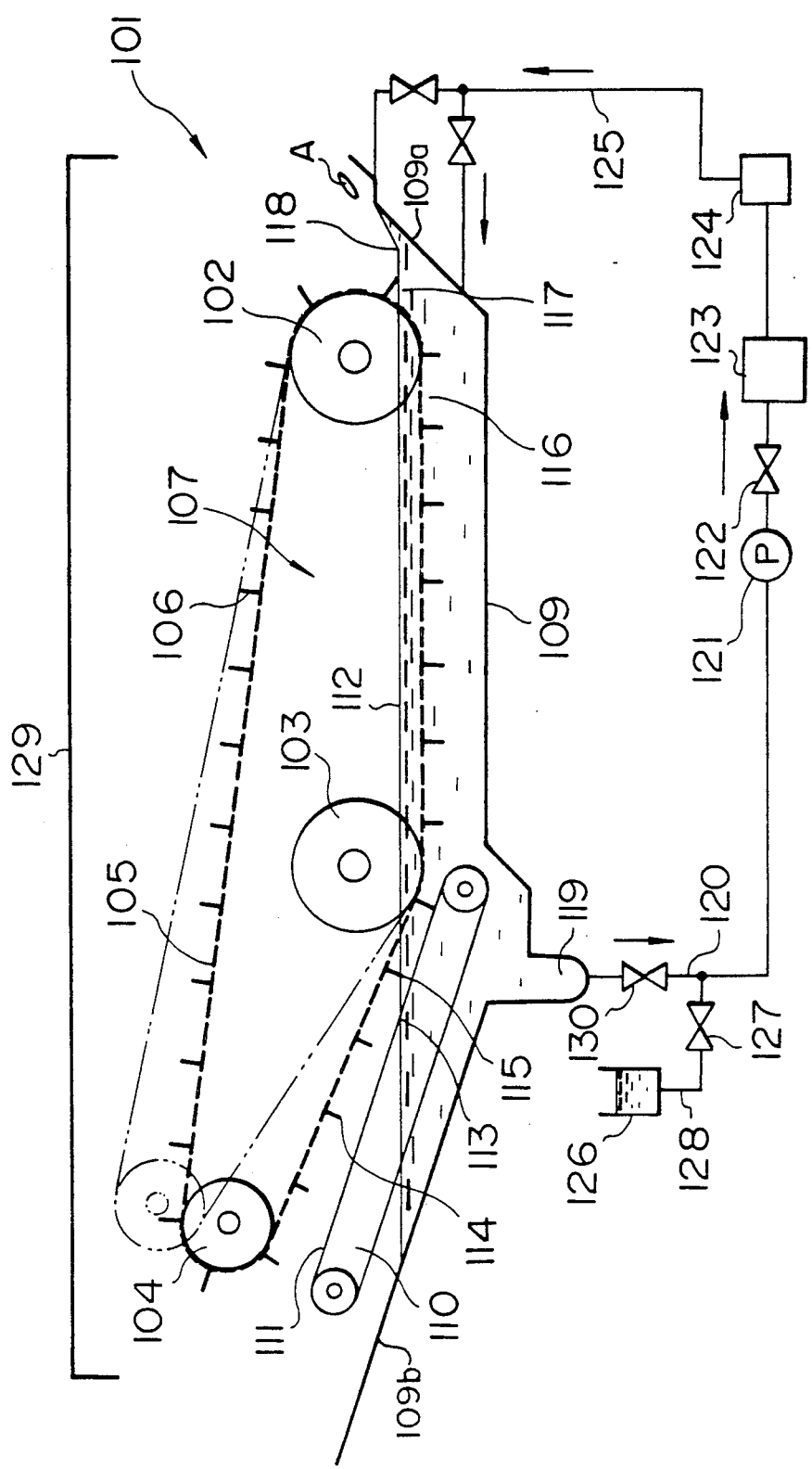
FIG. 3 is a schematic view of a continuous frying apparatus of a second embodiment of the present invention.
Figure 4:
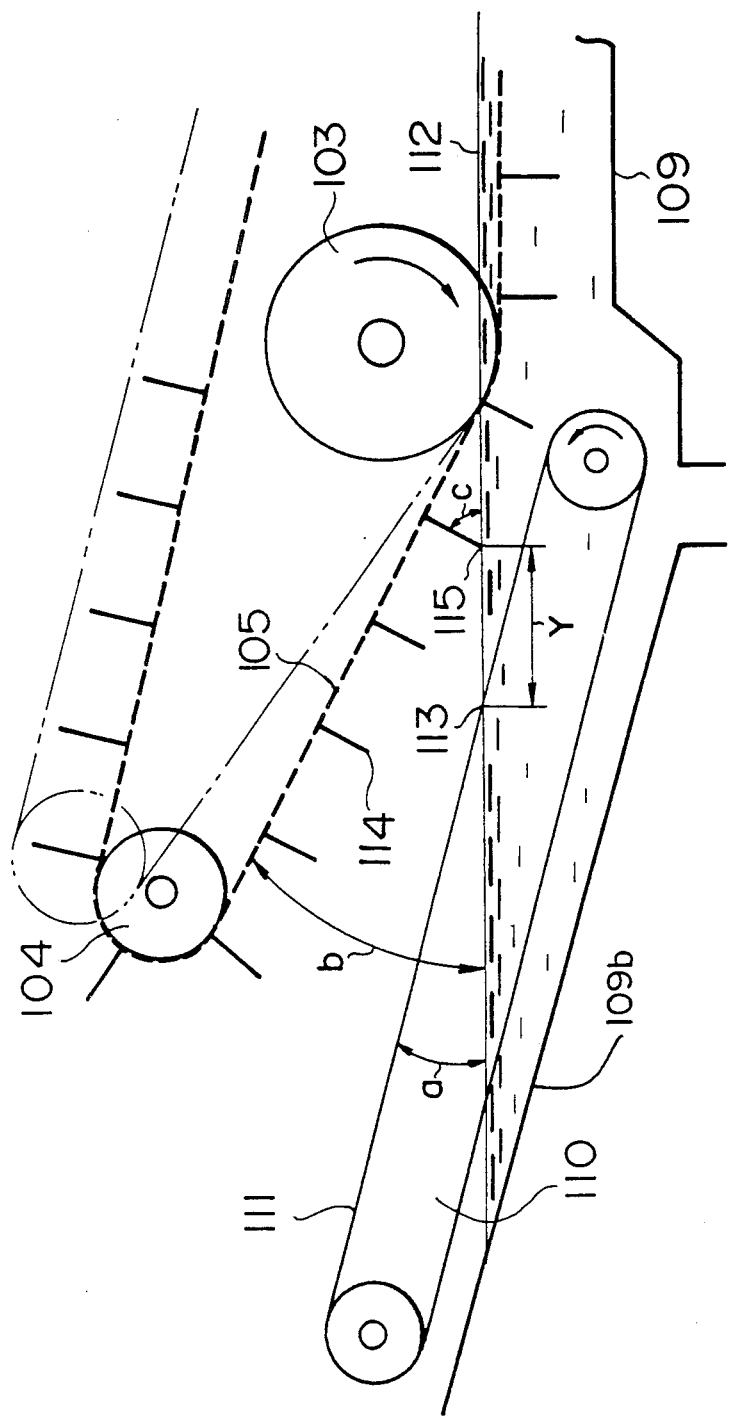
FIG. 4 is an enlarged schematic view showing a region of a ending side of the frying apparatus of FIG. 3.

A frying vessel 109 of a continuous frying apparatus 100 of the second embodiment of the present invention, as shown in FIGS. 3 and 4, has a shallow bottom. A conveyor 107 is arranged in the frying vessel 109 so that it extends from the starting side (inlet side) 109a to the ending side (outlet side) 109b thereof to convey the foodstuff "A" while it is immersed beneath the surface of the oil. The conveyor 107 includes rollers 102, 103 and 104, the speed of rotation of which can be controlled, for example, by a an infinitely variable-speed motor and a running member 105 moving around the rollers 102, 103 and 104 and interlocked therewith.

Each of rollers 102, 103 and 104 are mounted so that their positions can be changed vertically and horizontally.

It is preferable that the roller 104 is positioned so that the the running member 105 between the rollers 103 and 104 inclines in upward and rearward fashion. More particularly the roller 104 is positioned so that an angle "b" defined by the running member 105 extending from the roller 103 arranged at the ending side 109b of frying vessel 109 to the roller 104 and by the oil level 112 is 3° to 20°.

The running member 105 can be made of a heat resistant plastic sheet such as Teflon or polyethylene in which perforations of any suitable configuration through which the foodstuff cannot pass or can be made of sheet or meshed steel or stainless steel. The lower running part of the running member 105 is positioned below the oil level so as to effectively prevent the fry materials in the frying vessel 109 from floating on the surface of the oil.

The numeral 106 denotes projections which protrude from the outer surface of the running member 105 at a suitable angle relative thereto. The foodstuff "A" flows into the frying vessel 109 and is guided by partitions 116 formed between consecutive projections 106. The side walls of the frying vessel 109 also assist in guiding the foodstuff through the oil conveyed by the motion of the running member 105.

The projections 106 are mounted so that the intersection 117 of the ends 114 of the projections 106 moving around the roller 102 close to the starting side 109a of the frying vessel 109 is positioned nearer the ending side 109b of the frying vessel 109 than the intersection 118 of the oil stream flowing into the frying vessel 109. The intersection 117 is defined by the point at which the ends 114 meets with the oil level 112 and the meeting point 118 is defined by the point at which the oil stream flowing meets with the oil level 112. In addition, the distance between the intersections 117 and 118 is set so as to prevent the prolonged stay of the foodstuff "A" above the oil level 112. Furthermore the length of the projections 106 should be determined so that any foodstuff "A" is never sandwiched or clogged in the passage way between the ends 114 of the projection 106 and the bottom of the frying vessel 109.

The projections 106 may be formed by any suitable solid plates or perforated plates. The solid plates 106 are suitable for discharging the fried products from the oil onto a discharging conveyor 110. The perforated plates 106 such as meshed plates are suitable for effectively separating from the projections 106 the fried foodstuff stuck to the projections 106 during the passage through the oil in the frying vessel 109.

An oil pool 119 is constituted using a meshed metal screen at the ending side 109a of the bottom of the frying vessel 109 and a discharging pipe 120 is connected to the oil pool 119.

The discharging pipe 120 connected to the oil pool 119 is connected to the oil supplying pipe 125 which is connected with the starting side 109b and its lower portion of the frying vessels 109 forming an oil circulating path via an oil circulating pump 121, an oil flow rate control valve 122, an oil strainer 123 and a heat exchanger for heating oil 124.

It is possible to provide a heat exchanger for cooling the oil (not shown) in another path in addition to the heat exchanger for heating the oil 124 in order to prevent the degradation of oil.

A fresh oil tank 126 is connected to the oil circulating path via a fresh oil supplying pipe 128 and a control valve 127 connected to the oil discharging pipe 120. Fresh oil is supplied to the oil circulating path as necessary by opening a control valve 127.

A hood 129 is arranged above the frying vessel 109 and extends from the starting side 109a to the ending side 109b of the frying vessel 109. The hood 26 prevents the dissipation of oil heat to the atmosphere and prevents the oxidation of the oil.

A reference numeral 110 denotes a discharging conveyor used to pick up the fried products from the frying vessel 109 and discharge them therefrom while removing any excess oil from the fried materials.

A characteristic feature of the present invention is the angle "b" of the running member 105 extending from the roller 103 arranged at the ending side 109b of a frying vessel 109 to the roller 104.

That is, the angle "b" should be between 3° to 20° as mentioned above.

It is preferable to arrange the projections 106 so that an angle "c" defined by the projection 106 or the extension thereof and the oil level 112 is between 45° to 90°.

Under the circumstances according to the present invention, the discharging conveyor 110 is set so that it satisfies the following conditions.

First, the bottom end of the discharging conveyor 110 is positioned in the oil and the top end thereof is positioned above the rear end of the second heating vessel. In this case it is preferable to position the bottom end of the discharging conveyor 110 near the bottom of the frying vessel 109 so as to prevent the foodstuff "A" from flowing toward the oil pool 119 by the flowing force of the stream of oil.

Second, an angle "a" defined by the upper surface 111 of the discharging conveyor 110 and the oil level 112 is set between 3° to 7° in order to fascilitate the transfer of the fried foodstuff "A" onto the discharging conveyor 110 and to prevent the fried foodstuff "A" once pushed onto the discharging conveyor 110 from being dropped back into the oil.

Third, a distance "Y" between the contact point 113 where the upper surface 111 of the discharging conveyor 110 and the oil level 112 meet and the contact point 115 where the oil level 112 and the ends 114 of the projections 106 at the ending side of the frying vessel 109 meet where the variable "Y" satisfies the following expression:

$$Y \geq X/\sin "b"$$

wherein "X" = the number of the fry materials "A" contained in a partition formed by a pair of consective projections 106 and side walls of the frying vessel 109 × (the speed of the running member 105/the speed of the discharging conveyor 110) × the thickness of a single fried foodstuff "A".

The conveyor belt of the discharging conveyor 110 may be made of any suitable heat resistant material such as iron or stainless steel. It is also possible to use an embossed member or a meshed member in order to prevent the fried products from being dropped back into the oil, and to facilitate the removal of the excess oil from the fried foodstuff.

An example of a frying method using the apparatus of the present invention will be hereinafter described.

Foodstuff "A" is continuously supplied to the starting side of the frying vessel 109 in accordance with any suitable feeding method. Oil of high temperature is also continuously fed into the frying vessel 109 through the openings via the oil supplying pipe 125.

The foodstuff "A" is led to the starting side of the frying vessel 109 and is successively drawn into each partition 116 and fried beneath the surface of the oil during the conveyance thereof in accordance with the movement of the running member 105. It is preferable to set the speed of the running member 105 and the speed of the oil flowing in the frying vessel 109 to the same velocity in order to effectively prevent the generation of the turbulence which can cause damage to the foodstuff "A".

Fresh oil is forcibly supplied as necessary from a low position at the starting side of the frying vessel 109. This stream of the fresh oil facilitates the smooth transfer of the foodstuff "A" into the conveyor region under the oil level, and contributes to the sufficient and uniform puffing of and evaporation of water from the foodstuff "A". The stream of the fresh oil also has a function of carrying away the foodstuff debris settled on the bottom of the frying vessel 109 toward the oil pool 119. If the projections 106 are made of a perforated plate they are effective in the removal of debris stuck to the plates 106 during the passage in the oil in the frying vessel 109.

It is necessary to adjust the position of the running member 105 of the conveyor 107 or to supply the oil so that the lower running member 105 is always immersed in the oil so as to carry out the frying process always in the oil beneath the surface 112 of the oil. The oil level 112 in the frying vessel 109 can be also adjusted by appropriately controlling the oil level controlling valve 130 provided in the discharging pipe 120. The valve 130 is in a normally opened condition.

The travelling speed of the running member 105 is approriately adjusted in accordance with the desired processing time and processing amount in the frying vessel 109.

The foodstuff "A" is conveyed through the oil to the ending side 109b of the frying vessel 109 while being held beneath the surface level of the oil. The foodstuff "A" floats at the surface 112 of the oil at the ending side 109b of the frying vessel 109 and is then pushed by the projections 106 onto the discharging conveyor 110 and finally discharged from the frying vessel 109 after having the excess oil removed therefrom. The discharged fried foodstuff is then cooled by an appropriate method.

An important feature in this embodiment of the present invention is the transfer of the foodstuff "A" onto the discharging conveyor 110 together with the oil in order to prevent the fried products being broken. Also it is important to set the distance between the ends 114 of the projections 106 and the upper surface 111 and to set the inclination angles of the discharging conveyor 110 and the running member 105 between the rollers 103 and 104 so as to refrain from keeping the fried foodstuff "A" in the oil for a prolonged period of time and also to prevent the fried foodstuff "A" from being strongly raked up from the oil.

Since the fried foodstuff is transferred onto the discharging conveyor and then discharged out of the frying vessel without disturbance to its structure the continuous frying apparatus of the present invention makes it possible to obtain uniformly fried and highly puffed fried foodstuff having no deformation and breakage.

What is claimed is:

1. A continuous frying apparatus for frying a foodstuff "A" comprising:

a primary frying vessel having a starting side and an ending side, for transferring foodstuff "A" with a stream of oil flowing downward and out of said ending side;

a secondary frying vessel having a starting side and an ending side, for holding and frying foodstuff "A" in a supply of oil having a surface, the surface of the oil in said secondary frying vessel having an intersection with the stream of oil flowing downward and out of said ending side of said primary frying vessel;

a joining section for connecting said ending side of said primary frying vessel to said starting side of said secondary frying vessel; and a conveyor for holding and frying foodstuff "A" beneath the surface of the oil in said secondary frying vessel, said conveyor including a first roller arranged nearest said starting side of said secondary frying vessel, a second roller arranged nearest said ending side of said secondary frying vessel, a third roller arranged intermediate said first and second rollers, and a running member moving around said first, second and third rollers and interlocked therewith, said running member including an outer surface and projections arranged on said outer surface, and said projections having outer ends defining a circular arc around said first roller, said circular arc having an intersection with the surface of the oil in said secondary frying vessel;

wherein said first roller is positioned so that said intersection of said circular arc with the surface of the oil in said secondary frying vessel is closer to said ending side of said secondary frying vessel than to the intersection of the surface of oil in said secondary frying vessel with the stream of oil flowing downward and out of said ending side of said primary frying vessel.

2. A continuous frying apparatus for frying a foodstuff "A" comprising:

a frying vessel for holding and frying foodstuff "A" in a supply of oil having a surface, said frying vessel having a starting side, an ending side, and side walls;

a frying conveyor for holding and frying foodstuff "A" beneath the surface of the oil in said frying vessel, said conveyor including a first roller arranged nearest said starting side of said frying vessel, a second roller arranged nearest said ending side of said frying vessel, a third roller arranged intermediate said first and second rollers, and a running member moving around said first, second and third rollers and driven thereby, said running member including an outer surface and projections arranged on said outer surface, said running member between said second and third rollers defining an angle "b" with the surface of the oil in said frying vessel, said projections having outer ends having an intersection with the surface of the oil in said frying vessel between said second and third rollers, and consecutive projections defining with said side walls of said frying vessel a plurality of partitions; and a discharging conveyor for discharging fried foodstuff "A" from said frying vessel, said discharging conveyor having a top end, a bottom end, and an upper surface having an intersection with the surface of the oil in said frying vessel and defining an angle "a" with the surface of the oil in said frying vessel;

wherein said second roller is positioned so that said angle "b" is between 3° and 20°;

wherein said discharging conveyor is positioned with said bottom end in the oil and said top end above the surface of the oil at said ending side of said frying vessel;

wherein said angle "a" is between 3° and 7°; and wherein, for a speed "s1" of said running member, a speed "s2" of said discharging conveyor, and a thickness "T" of a single piece of foodstuff "A", the intersection between said upper surface of said discharging conveyor and the surface of the oil in said frying vessel and the intersection of said outer ends of said projections with the surface of the oil in said frying vessel are separated by a distance "Y" according to the expression:

$$Y \geq X/\sin b,$$

wherein "X" = the number of pieces of foodstuff "A" contained in one of said partitions x (s1/s2) x T.

* * * * *